United States Patent [19]

Martig, Jr.

[11] 4,145,926
[45] Mar. 27, 1979

[54] FLOW MONITORING

[75] Inventor: Kenneth W. Martig, Jr., Olympia, Wash.

[73] Assignee: Pro-Tech, Inc., Paoli, Pa.

[21] Appl. No.: 872,425

[22] Filed: Jan. 26, 1978

Related U.S. Application Data

[63] Continuation-in-part of Ser. No. 841,576, Oct. 12, 1977, abandoned.

[51] Int. Cl.² ................................................ G01F 1/34
[52] U.S. Cl. .................................. 73/194 R; 73/215; 73/302
[58] Field of Search ...................... 73/194 R, 215, 302

[56] References Cited

U.S. PATENT DOCUMENTS

| | | | |
|---|---|---|---|
| 3,573,019 | 3/1971 | Rees | 73/212 X |
| 3,638,490 | 2/1972 | Buettner | 73/302 X |
| 3,727,459 | 4/1973 | Buettner | 73/205 R |

FOREIGN PATENT DOCUMENTS 2305318  8/1974  Fed. Rep. of Germany ............ 73/215

Primary Examiner—Charles A. Ruehl
Attorney, Agent, or Firm—Charles A. McClure

[57] ABSTRACT

A method is provided for monitoring liquid flow in an open pipe or conduit wherein sensor means is located adjacent the invert or bed at the inside thereof and the depth of liquid is determined by the bubbler method. To minimize interferences with the liquid flow the bubble fluid is conducted from the exterior along the inside wall and to the vicinity of the flow bed in the pipe or conduit. The sensor means and the bubble fluid conductor are retainable in place by supporting means adapted to be expanded into secure frictional engagement with the inside wall of the pipe or conduit. The flow is determined by releasing the bubble fluid bubble-wise against the static pressure of the overlying liquid, sensing such pressure, indicating it in terms of liquid depth, and converting depth to flow by conventional methods.

6 Claims, 3 Drawing Figures

U.S. Patent  Mar. 27, 1979  4,145,926
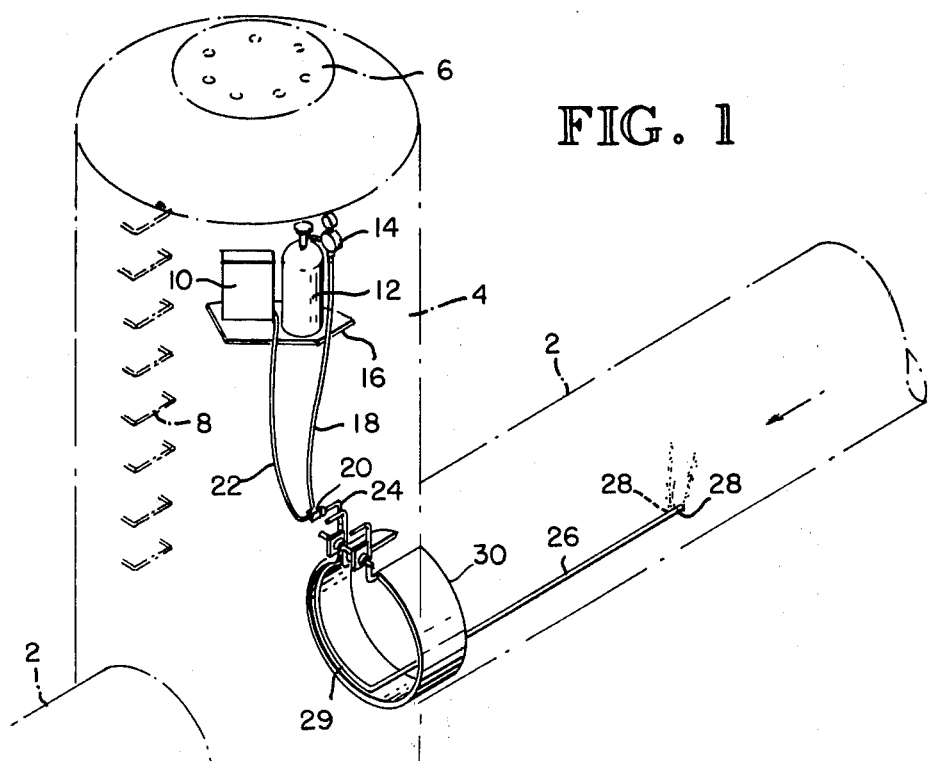
FIG. 1
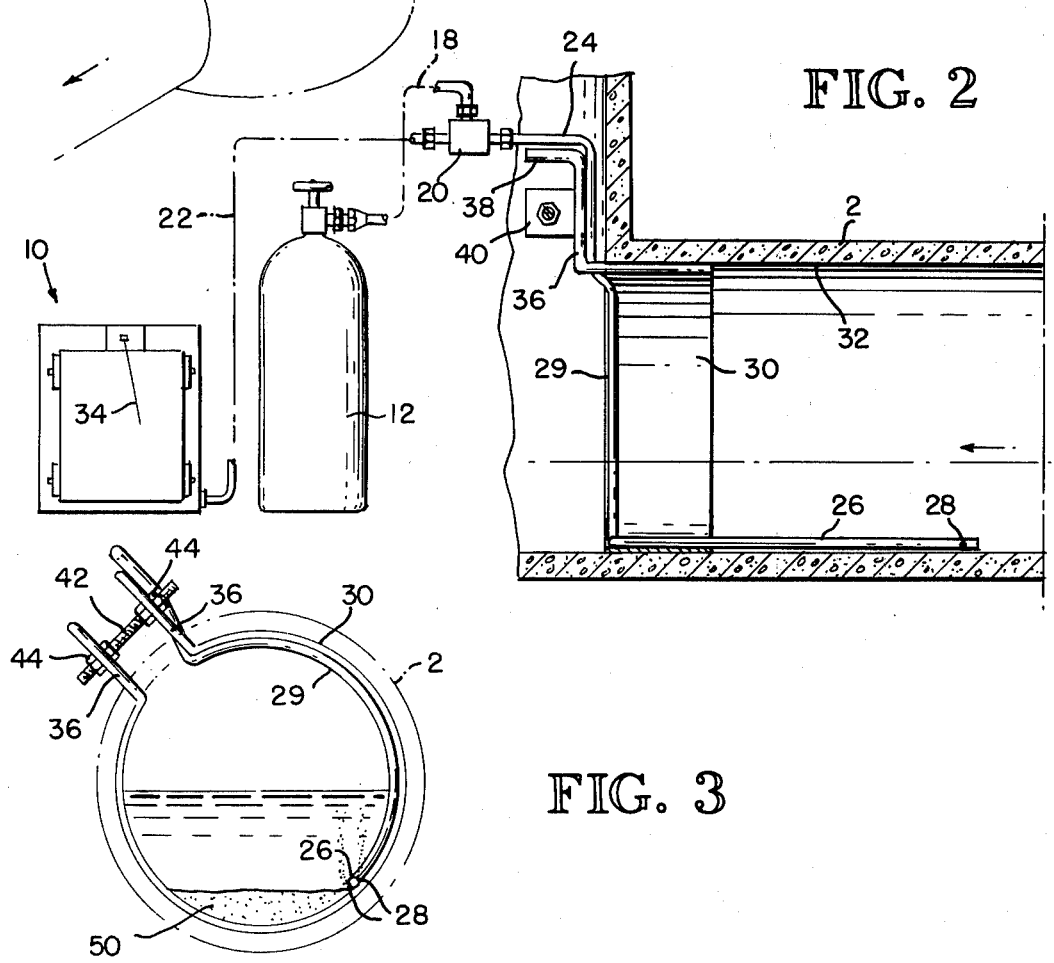
FIG. 2
FIG. 3

FLOW MONITORING

This Application is a continuation-in-part of my copending patent application Ser. No. 841,576 filed Oct. 12, 1977, and a substitute for my abandoned patent application Ser. No. 700,228 filed June 28, 1976, said copending application being a continuation-in-part of my application Ser. No. 695,545 filed June 14, 1976, and now U.S. Pat No. 4,058,011. The mentioned June 1976 applications were each a division or a continuation of my prior application Ser. No. 503,392 filed Sept. 5, 1974 and now U.S. Pat. No. 3,965,740.

In the past, raw sewage has been combined with natural drainage and the drainage system has included drain pipes larger than the predicted normal flow to accommodate all flows at all times so it would not back up under times of unexpected demand. Systems that handle raw sewage must be monitored to record any predicted increase in demand due to storm inflow or ground water infiltration. The monitoring of the flow further enables an observer to quickly recognize an increase and/or decrease caused by a failure of the sewage system which admits ground water infiltration or surface drainage into the system or alternatively releases raw sewage to the surroundings.

Liquid flow within an open pipe or conduit may be determined through the use of the Manning flow relationship or formula, wherein if the pipe size is known, also the slope and the material thereof, as well as the liquid depth, then by use of the Manning formula the flow can be determined. Alternatively, flumes and weirs may be employed because of their known depth-to-flow relationships, or flow velocity may be measured by interposing suitable sensing means. Regardless of method, however, knowledge of the liquid depth is an essential in the computation of flow.

One method of monitoring the depth in the past has been through use of a "dipper" which essentially is a plumb bob lowered through a manhole entry to the sewer liquid flow surface. The weighted element indicates the surface of the liquid in the manhole and thus the flow of fluid may be approximately determined. One of the disadvantages of the dipper lies in the fact that it, as noted above, is dropped down a manhole which is normally an area of disturbed flow. The liquid flows out of a conduit into the manhole base, which is not coincident with the internal surface of the conduit and thus disturbances are generated, effectively changing the depth at that point from what it actually is in the pipe where properties are known. Further, the dipper, when used in a sewer which transports raw sewage, often becomes contaminated and the measurement is thus distorted by the interaction or hang-up of the various particles and material carried within the sewer. These interference items cause the approximate pipe depth reading to be even less accurate.

With the above noted disadvantage of pre-existing flow measuring techniques in mind, it is an object of the present invention to provide a method whereby the depth within an open channel may be continuously recorded without requiring full time operator surveillance.

Further, it is an object of the present invention to provide a novel method for readily measuring the depth of flow in an open channel, thus enabling the rate of flow within the channel to be accurately determined.

It is yet another object of the present invention to utilize a recording device, a source of gaseous bubble fluid under pressure and a probe with an orifice such that the gas forced through the outermost end will bubble through the flowing liquid in the open channel. The resistance to the outward flow of the gas can be recorded, for determining the depth of liquid over the probe and thereby, as by use of the Manning formula, determining the rate of flow of the liquid within the channel.

It is still another object of the present invention to determine the rate of flow within an open channel wherein the apparatus for determining said flow is located very near the wall of the channel and therefore at a position of theoretical zero velocity, greatly decreasing the possibility of interference with the flow or interference of the measurement by solid particles within the liquid flow.

Other objects of the present invention, together with means and methods for attaining the various objects, will be apparent from the following description and the accompanying diagrams of a specific embodiment thereof, which is presented by way of example rather than limitation.

FIG. 1 is an environmental perspective view disclosing flow measuring apparatus wherein a recorder and an air supply tank are located within the manhole of a sewer system and the probe means of this invention is inserted within the conduit which carries the flow of liquid.

FIG. 2 is a partially schematic view emphasizing the location of the probe and its supporting collar and interconnection with the air supply tank and the recorder, however with the air supply tank and recorder displaced for clarity.

FIG. 3 is an elevational view of the probe showing how the probe will be displaced in the event there is substantial sludge in the bottom of the channel and further depicting how the collar will be locked into position within the channel.

As seen in FIG. 1, the preferred embodiment and use of the present invention is in a sewage flow line as schematically shown which has hollow cylindrical flow pipes 2 periodically interspersed with manholes 4 having manhole openings 6 and ladders or the like 8 leading to the lower portions of the manhole. The manhole opening and ladder permit inspection of the system and placement of apparatus for practicing this invention within the sewer pipe as shown. As can be seen in this view, the liquid flowing within the sewer pipe, when it reaches the intersection with the manhole, will be caused to change to an uneven or disturbed flow which will greatly affect any depth measurements taken within the channel bottom of manhole 4.

The present invention utilizes a recording device 10, which is an off-the-shelf or standard item and therefore will not be described in great detail, but that is capable of recording a back-pressure or differential in pressure as to be explained hereinafter. The recorder 10 and the portable supply of pressurized air 12 in the form of a tank having a flow regulator 14 mounted thereon are shown as mounted upon shelf 16 within the manhole but could equally well be secured to the ladder 8 or otherwise placed within the manhole. It is only required that their location is relatively secure and above the normal expected flow within the sewer and yet in the interest of compactness of the entire package, reasonably accessible.

The interconnection between the pressurized bottle 12 and the recorder 10 is by way of a flexible conducting line 18 leading to a T-connection 20 having extending outwardly therefrom a conduit 22 leading back to the recorder 10 as well as the hollow conducting tube 24 which is semi-rigid and extends downwardly following the contour of the pipe and, as explained hereinafter, extends linearly upstream into the interior of the sewer pipe to be directly affected by the pressure created by the depth of liquid flowing over the outer end thereof.

As can be seen in this view, the probe includes a long, thin, hollow tube 26 extending linearly into the channel, lying in the cradle or invert thereof, and having a through bore 28 extending transversely therethrough and having the end of the tube closed. The tube is placed in the cradle such that the bore 28 lies in a horizontal plane. When the probe 26 is thus placed, its two lateral openings to the liquid at the same depth allow a reasonably accurate approximation of the depth of the liquid even if one of the holes should become plugged or otherwise impeded. The tube lies in the cradle of the pipe and extends from a position upstream of the manhole where the bubble releasing ports are located to a position adjacent the manhole opening at which point it forms an approximate semi-circle. The curved or semi-circular portion 29 is interconnected at its upper end with the semi-rigid connecting tube 24 as described above. The semi-circular portion 29 lies inside a flexible collar 30 and is contiguous therewith. The collar 30 has sufficient width to assure alignment with the conduit such that the tube is parallel to the bottom of the conduit. The collar is expandable by means explained hereinafter such that the collar may be fixedly secured within the conduit 2.

Referring now to FIG. 2, it can be seen that the collar 30 is intimately engaged with the interior surface 32 of the conduit 2 and thus is at a position of theoretical zero velocity preventing interference and/or hang-up with the solids or semi-solids within the flow. The tube 26 extends longitudinally into the conduit 2 and lies within the cradle thereof and therefore is very close to the bottom of the conduit and also in a position of theoretical zero velocity. The semi-circular portion 29 of the tube is secured adjacent the interior of the collar 30 and does not vary therefrom until the upper portion thereof, a position which is normally outside the expected flow. As can be seen the semi-rigid conducting portion 24 extends into a T-connection 20 and thus into a bubble fluid or pressure line 18 leading to a pressurized tank 12 as well as into a static line 22 leading into a recorder 10 having a needle 34 or some other means of recording the back pressure generated in distribution of the pressurized gas from within the tank 12 through the probe 26 and its associated horizontal openings 28 into the overlying liquid.

Referring now to FIG. 3. the means for locking the collar 30 in position within the conduit 2 may more readily be seen. As seen in this figure, the collar is not a complete circle and has secured to its outer ends radially outwardly extending handle means 36 which terminates in axially directed handle portions 38.

As best seen in FIG. 2, the collar includes a plate 40 secured to the radial portion of each of the handles 36 and has extending therethrough as seen in FIG. 3 a threaded bolt 42 having nuts 44 adjacent each of the brackets 40. When it is desired to place the probe within the conduit 2, the collar may be compressed to a smaller diameter, slipped into position and then allowed to expand. The collar is locked in place by means of the interior nuts 44. Further as seen in FIG. 3, the semi-circular portion 29 of the interconnecting tube is closely married to the collar 30 for minimal impedance and lies in the position of theoretical zero velocity.

FIG. 3, besides showing the details of the collar, and its adjusting mechanism, further discloses the means for approximating the depth of the fluid in a conduit 2 wherein a significant amount of sludge 50 has collected at the bottom. In conditions such as this, the tube 26 is placed at approximately the upper surface of the sludge 50, and thus the depth between the sludge and the top of the flowing liquid is measured. However, any changes in the flow will still be readily determined by a change in the actual depth as measured.

Thus, as can be seen, the present invention provides an efficient as well as an inexpensive portable means for continually monitoring the flow of liquid within an open channel. The amount of time that the monitoring system can be left to function and record any changes in depth will be directly dependent upon the amount of gas under pressure within the pressurized tank, the rate at which it is bubbled into the liquid, and the amount of time available for recording. The present invention provides a unique approach and method to accurately monitor the flow in an open channel and because of the placement of the various devices does not restrict the flow within the channel and thus renders an accurate measurement, a measurement which is accurately reflective of the flow as unaffected by the placement of the measuring device.

Although a preferred embodiment of the invention has been shown and described, it should be understood that modifications may be made therein, as by adding, combining, or subdividing parts or steps, or by substituting equivalents, while retaining advantages and benefits of the present invention, which itself is defined in the following claims.

I claim:

1. In monitoring of liquid flow under open-channel conditions through a sewer or water pipe or conduit wherein sensor means is located adjacent the invert or bed of the inside wall thereof, and the depth of liquid therein is determined by the bubbler method, the improvement comprising conducting bubble fluid from the exterior to a location adjacent such inside wall to minimize interference with such liquid flow, and retaining the sensor means and the bubble conductor in place therein by lateral friction against such inside wall by providing expansible support means for the sensor means and the bubble conductor and expanding such support means against such inside wall.

2. Flow monitoring method according to claim 1, including the steps of releasing the bubble fluid bubble-wise adjacent the invert or bed and measuring the pressure of overlying liquid at the release location.

3. Flow monitoring method according to claim 1, wherein the support means is expanded by rotating one of a plurality of threaded members attached to spaced ends of the support means relative to another of such threaded members.

4. A method of continually monitoring the flow of liquid in an open conduit, comprising the steps of placing a probe comprisingan elongated hollow tube, having at least one restricted opening, in one end and being open at the other end, into the conduit with the tube lying in the bottom of the conduit in a position whereat said tube does not substantially impede the flow of liquid, said tube being substantially parallel to the direction of flow of liquid and extending to a position of nonturbulent flow, securing the probe in position by expanding a collar element against the walls of the conduit, limiting the location of the tube and its securement means to a portion of the liquid having substantially zero velocity, thus preventing an inadvertent dislodgement thereof, attaching the open end of the tube to a source of gaseous bubble fluid under pressure, measuring the back pressure generated when the bubble fluid is forced through the tube thus determining the depth of the liquid, and using the information gathered to determine the rate of flow of the liquid within the conduit.

5. A method as in claim 4, and further including the step of adjusting the probe so that the bubble tube is located on top of any sludge which has accumulated in the bottom of the conduit.

6. A method as in claim 4, and further including the steps of locating and securing said source of bubble fluid under pressure and a recording device in a secure location adjacent the conduit.

* * * * *